United States Patent
Li et al.

(10) Patent No.: US 12,281,025 B2
(45) Date of Patent: Apr. 22, 2025

(54) TUNGSTEN HEXAFLUORIDE PREPARATION METHOD AND APPARATUS BASED ON PHOTOELECTRIC SYNERGY

(71) Applicants: Hubei University of Technology, Wuhan (CN); Electric Power Research Institute China Southern Power Grid, Guangzhou (CN); Handan Puxin Electric Power Technology Co., Ltd., Handan (CN)

(72) Inventors: Yalong Li, Wuhan (CN); Xiaoxing Zhang, Wuhan (CN); Mingli Fu, Guangzhou (CN); Zhaodi Yang, Wuhan (CN); Lei Jia, Guangzhou (CN); Kun Wan, Wuhan (CN); Dibo Wang, Guangzhou (CN); Guozhi Zhang, Wuhan (CN); Shuangshuang Tian, Wuhan (CN); Guoguang Zhang, Wuhan (CN); Guangke Li, Handan (CN)

(73) Assignees: Hubei University of Technology, Wuhan (CN); Electric Power Research Institute China Southern Power Grid, Guangzhou (CN); Handan Puxin Electric Power Technology Co., Ltd., Handan (CN)

(*) Notice: Subject to any disclaimer, the term of this patent is extended or adjusted under 35 U.S.C. 154(b) by 0 days.

(21) Appl. No.: 18/931,608

(22) Filed: Oct. 30, 2024

(65) Prior Publication Data
US 2025/0091898 A1   Mar. 20, 2025

(30) Foreign Application Priority Data
Sep. 20, 2023   (CN) .......................... 202311214902.0

(51) Int. Cl.
*C01G 41/04* (2006.01)
*B01J 19/00* (2006.01)

(52) U.S. Cl.
CPC .......... *C01G 41/04* (2013.01); *B01J 19/0053* (2013.01)

(58) Field of Classification Search
CPC ............................ C01G 41/04; B01J 19/0053
See application file for complete search history.

(56) References Cited

U.S. PATENT DOCUMENTS

2010/0104497 A1*   4/2010   Jang ...................... B01J 8/1827
                                                            423/489

FOREIGN PATENT DOCUMENTS

| CN | 108298506 A | 7/2018 |
| CN | 114288961 A | 4/2022 |
| JP | H11224633 A | 8/1999 |

OTHER PUBLICATIONS

Title of the Item: journal Publication Date: Jan. 31, 2011 Name of the Author: Ou Rui-Kun, Chen Li, Yan Zong-Cheng, Wang Hong-Lin Article Title: Decomposition of Volatile Organic Compounds by Non-thermal Plasma-Catalyst Hybrid Technology pp. 79-84.

(Continued)

*Primary Examiner* — James A Fiorito
(74) *Attorney, Agent, or Firm* — George D. Morgan

(57) ABSTRACT

Disclosed are a tungsten hexafluoride preparation method and apparatus based on photoelectric synergy. A photocatalyst and metal tungsten are sequentially filled in a discharge area of a plasma reactor in a direction of gas entry, and the discharge area of the plasma reactor is irradiated with light at the same time; the background gas generates a large amount of plasma in the discharge area, $SF_6$ undergoes decomposition under the synergistic effect of photocatalysis and plasma, $SF_6$ is decomposed to generate fluorine atoms and low-fluorine sulfides such as $SF_5$ and $SF_4$. The generated (Continued)

fluorine ions, $SF_5$, $SF_4$ and low-fluorine sulfides further react with metal tungsten to generate $WF_6$ specialty gas, which not only realizes the utilization of fluorine resources of $SF_6$, but also replaces highly toxic fluorine gas with non-toxic $SF_6$ exhaust gas in the plasma reactor for reaction, thereby ensuring safe operation and low energy consumption.

4 Claims, 1 Drawing Sheet

(56) References Cited

OTHER PUBLICATIONS

Title of the Item: book Publication Date: Oct. 31, 2018 Name of the Author: Yafei Zhang, Li Duan Article Title: Integrated Circuit Manufacturing Technology p. 228.

\* cited by examiner

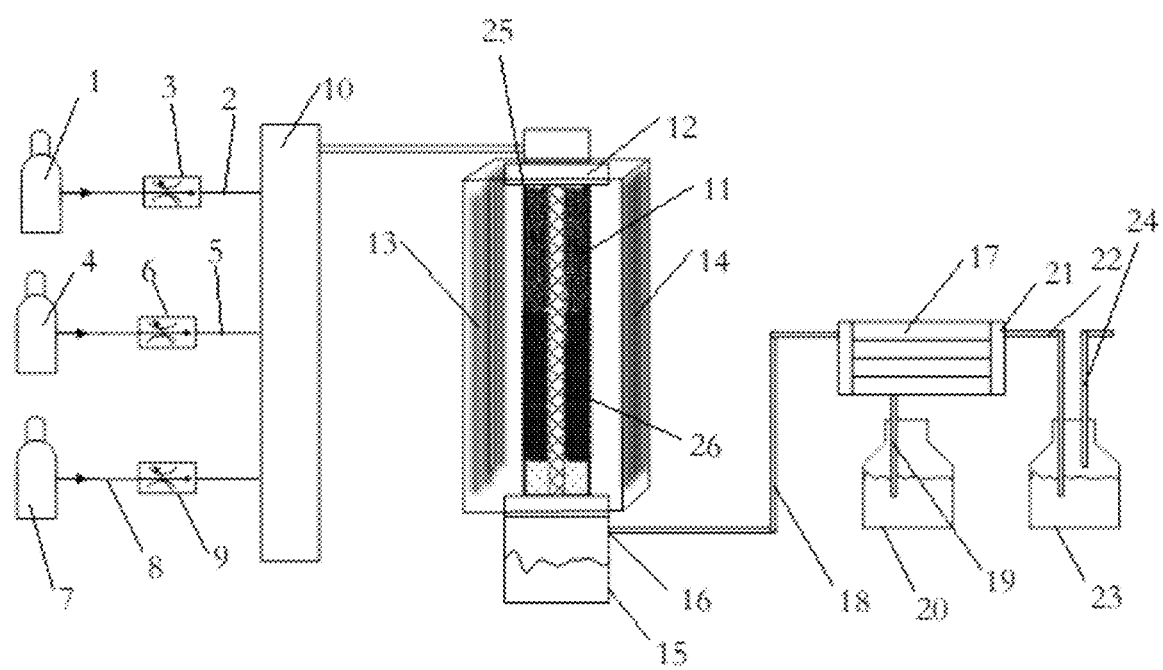

TUNGSTEN HEXAFLUORIDE PREPARATION METHOD AND APPARATUS BASED ON PHOTOELECTRIC SYNERGY

CROSS-REFERENCE TO RELATED APPLICATIONS

The application claims priority to Chinese patent application No. 2023112149020, filed on Sep. 20, 2023, the entire contents of which are incorporated herein by reference.

TECHNICAL FIELD

The present disclosure belongs to the technical field of sulfur hexafluoride resource utilization, and particularly relates to a tungsten hexafluoride preparation method and apparatus based on photoelectric synergy.

BACKGROUND

Sulfur hexafluoride ($SF_6$) is an artificially synthesized fluoride with an extremely stable molecular structure and excellent arc-extinguishing and insulation performance. Since the 1970s, $SF_6$ has been widely used in various electrical devices and mainly used as an insulation and arc-extinguishing medium for the electrical devices, including gas-insulated circuit breakers, gas-insulated current transformers, and the like. As a gas with the strongest greenhouse effects among non-$CO_2$ greenhouse gases, $SF_6$ also has an extremely long atmospheric lifetime, with its atmospheric content increasing year by year. $SF_6$ emissions in China reached 3.2 (2.6-3.8) Gg/yr in 2018, the emissions present a trend of increasing year by year, and more than 95% of the $SF_6$ emissions are discharged by the power industry. Since the end of the previous century, as environmental concerns have become more serious year by year, the international community has paid greater attention to controlling the $SF_6$ emissions. In recent years, with the formulation of "carbon peaking and carbon neutrality" goals, degradation of $SF_6$ has become an inevitable trend.

At present, in order to minimize the damage of $SF_6$ to an atmospheric environment, various technologies, such as $SF_6$ purification and recovery, environmentally friendly insulation alternative gases for $SF_6$, and degradation and conversion of $SF_6$ exhaust gas, are adopted, of which the degradation technology is particularly reliable and can reach a high degradation rate. A dielectric barrier discharge low-temperature plasma method has shown significant advantages in the degradation of $SF_6$ exhaust gas, exhibiting strong discharge controllability, high energy efficiency, high degradation rate, and simple device structure. Therefore, the method has great potential for industrial application, and relevant cases of $SF_6$ exhaust gas treatment using the method are available. Furthermore, filling catalysts in a dielectric barrier reactor can effectively improve the degradation rate, energy efficiency, and product selectivity, proving excellent effects.

Fluorine-containing specialty gases, represented by tungsten hexafluoride ($WF_6$), are one of the key raw material for semiconductor device processing, and are known as "blood" of wafer manufacturing. However, the current production of $WF_6$ mostly involves heating metal tungsten (W) and fluorine gas ($F_2$), which has disadvantages such as high operational risk and great energy consumption.

SUMMARY

In order to solve the problems in the prior art, the present disclosure provides a tungsten hexafluoride preparation method and apparatus based on photoelectric synergy. The present disclosure utilizes plasma generated by photocatalysis and discharge to synergistically activate and degrade $SF_6$, such that $SF_6$ is decomposed into fluorine atoms and low-fluorine sulfides, which react with the metal tungsten to generate tungsten hexafluoride ($WF_6$) gas. The $WF_6$ gas is collected after condensation and liquefaction, a reaction temperature is controlled to be 120° C.-160° C., such that the generated sulfur is in a liquid state for easier collection. The present disclosure achieves the resource utilization of $SF_6$, providing a novel method and idea for the degradation and resource conversion of $SF_6$.

In order to achieve the above objectives, the present disclosure adopts the following technical solutions:

a tungsten hexafluoride preparation method based on photoelectric synergy, including the following steps:

S1. filling a photocatalyst and metal tungsten sequentially in a discharge area of a plasma reactor in a direction of gas entry;

S2. introducing background gas and sulfur hexafluoride gas into the discharge area of the plasma reactor while irradiating the discharge area of the plasma reactor with light; where the background gas is ionized into plasma, and the sulfur hexafluoride gas is activated and ionized to decompose into fluorine atoms and low-fluorine sulfides under the synergistic effect of plasma and photocatalysis; and S3: having the generated fluorine atoms and low-fluorine sulfides reacted with the metal tungsten to generate tungsten hexafluoride gas.

Further, the photocatalyst is $TiO_2$ or ZnO.

Further, the background gas is argon.

Further, in the step S2, light used for irradiation light is ultraviolet light.

Further, inn step S3, elemental sulfur is also generated while the tungsten hexafluoride gas is generated, a reaction temperature is controlled at 120-160° C., making the elemental sulfur become liquid; and the plasma reactor is tilted or placed vertically, such that the generated liquid elemental sulfur can flow out from a bottom of the plasma reactor for collection.

Further, in the step S2, reducing gas $H_2$ is introduced while the background gas and the sulfur hexafluoride gas are introduced into the discharge area of the plasma reactor while.

Further, the metal tungsten is loaded through a metal-organic framework and then filled into the discharge area of the plasma reactor.

Further, in the step S3, the generated $WF_6$ gas is condensed into liquid and then collected.

Further, in the step S3, the unreacted fluorine, low-fluorine sulfides, and generated impurity gases are absorbed and purified by alkaline solution.

A tungsten hexafluoride preparation apparatus based on photoelectric synergy is provided, the apparatus includes a sulfur hexafluoride gas supply unit, a background gas supply unit, a mixing unit, a hydrogen gas supply unit and a photoelectric combined reactor, where the sulfur hexafluoride gas supply unit and the background gas supply unit are connected to the mixing unit, respectively, the photoelectric combined reactor includes a plasma reactor and an encapsulation shell, the encapsulation shell encloses a discharge area of the plasma reactor, an outer shell of the discharge area of the plasma reactor is transparent, two ends of the encapsulation shell are respectively fixedly connected to two ends of the plasma reactor, inner wall surfaces of the encapsulation shell are mirror surfaces, at least two evenly distributed light source assemblies are arranged inside the encapsulation shell, each of the light source assemblies is located outside the plasma reactor, and the mixing unit is connected to an inlet of the plasma reactor.

The sulfur hexafluoride gas supply unit a sulfur hexafluoride gas cylinder, a first gas supply branch pipe and a first pressure-reducing valve, one end of the first gas supply branch pipe is connected to the sulfur hexafluoride gas cylinder, and the first pressure-reducing valve is installed on the first gas supply branch pipe; the background gas supply unit includes a background gas cylinder, a second gas supply branch pipe, and a second pressure-reducing valve, one end of the second gas supply branch pipe is connected to the background gas cylinder, and the second pressure-reducing valve is installed on the second gas supply branch pipe; the mixing unit includes a gas mixer, a gas supply main pipe, a flow meter, and a control valve, the other ends of the first gas supply branch pipe and the second gas supply branch pipe are connected to inlets of the gas mixer, one end of the gas supply main pipe is connected to an outlet of the gas mixer, the flow meter and the control valve are installed on the gas supply main pipe, and the other end of the gas supply main pipe is connected to an inlet of the plasma reactor.

The hydrogen gas supply unit includes a hydrogen gas cylinder, a third gas supply branch pipe, and a third pressure-reducing valve, where one end of the third gas supply branch pipe is connected to the hydrogen gas cylinder, the third pressure-reducing valve is installed on the third gas supply branch pipe, and the other end of the third gas supply branch pipe is connected to the inlet of the gas mixer.

The plasma reactor is placed vertically or tilted, an elemental sulfur collector is arranged at a bottom of the plasma reactor, the elemental sulfur collector is located below the plasma reactor, a first liquid outlet is arranged at the bottom of the plasma reactor, the elemental sulfur collector is communicated with first liquid outlet, and a gas outlet is formed on the plasma reactor or at a top of the elemental sulfur collector.

The apparatus further includes a condensation unit, which includes a condenser, a gas guide pipe and a tungsten hexafluoride collector, where one end of the gas guide pipe is communicated with the gas outlet of the plasma reactor, the other end of the gas guide pipe is connected to an inlet of the condenser, a second liquid outlet and a second gas outlet are formed on the condenser, and the tungsten hexafluoride collector is connected to the second liquid outlet.

The apparatus further includes an exhaust gas treatment unit, which includes an alkaline solution treatment pool, an exhaust gas inlet pipe, and an exhaust gas outlet pipe, where one end of the exhaust gas inlet pipe is connected to the second gas outlet, and the other end of the exhaust gas inlet pipe extends into a bottom of alkaline solution in the alkaline solution treatment pool; and the exhaust gas outlet pipe is communicated with upper alkaline solution in the alkaline solution treatment pool. Compared with the prior art, the present disclosure has the beneficial effects:

1. In the present disclosure, the background gas is easily excited to ionize and generate high-energy electrons in the discharge area, which can collide with $SF_6$ to activate the same, break its bonds and decompose to generate fluorine particles and low-fluorine sulfides ($SF_x$). Without the background gas, it is very difficult for $SF_6$ gas to be ionized and decomposed.
2. In the present disclosure, the background gas also plays a role in diluting $SF_6$, thereby achieving a precise dilution ratio to improve the degradation efficiency of $SF_6$.
3. In the present disclosure, photocatalyst and metal tungsten are sequentially filled in the discharge area of the plasma reactor in the direction of gas entry, and the discharge area of the plasma reactor is irradiated with light at the same time; the background gas generates a large amount of plasma (high-energy electrons) in the discharge area, $SF_6$ undergoes decomposition under the synergistic effect of photocatalysis and plasma, $SF_6$ is decomposed to generate fluorine atoms and low-fluorine sulfides such as $SF_5$ and $SF_4$. The generated fluorine ions, $SF_5$, $SF_4$ and low-fluorine sulfides further react with metal tungsten to generate $WF_6$ specialty gas, which not only realizes the utilization of fluorine resources of $SF_6$, but also replaces highly toxic fluorine gas with non-toxic $SF_6$ exhaust gas in the plasma reactor for reaction, thereby ensuring safe operation and low energy consumption.
4. In the present disclosure, the plasma reactor is tilted or placed vertically, the fluorine atoms and low-fluorine sulfides, such as $SF_5$ and $SF_4$, react with tungsten particles to generate sulfur. The temperature in the reaction area is controlled to be 120° C.-160° C. The generated elemental sulfur is in a liquid form, which can flow down along the wall of the plasma reactor and is collected at the bottom of the plasma reactor where an elemental sulfur collector is arranged.
5. In the present disclosure, hydrogen gas ($H_2$) is added in the reaction system as a reducing gas capable of promoting the generation of elemental sulfur, and $H_2$ can in turn greatly promotes the decomposition of $SF_6$ in the photocatalytic and electrocatalytic reaction areas.
6. In the present disclosure, the condenser temperature is adjusted according to the products, the temperature is controlled to be 5° C.-15° C. to have the $WF_6$ cooled and liquefied, and the liquid $WF_6$ can be collected for long-term storage, transportation, and purification.
7. In the present disclosure, the unreacted products of $SF_6$ and impurity gases, such as $SO_2$, $SOF_2$, and $SOF_4$, are treated in the alkaline solution treatment pool at the end of the apparatus to prevent them from being discharged into the atmosphere and causing damage to the atmosphere and environment.
8. The present disclosure proposes for the first time to replace highly toxic fluorine gas with non-toxic $SF_6$ exhaust gas to react with tungsten (W) to generate $WF_6$ under the conditions of plasma and photocatalysis. Compared with the traditional method of preparing $WF_6$ using metal tungsten and fluorine gas ($F_2$) at high temperatures, the present disclosure greatly lowers the reaction temperature, thereby significantly reducing energy consumption. In addition, the present disclosure ensures safe operation and achieves the utilization of sulfur-fluorine resources of $SF_6$, and solves the problem of low conversion rate of $SF_6$.

BRIEF DESCRIPTION OF THE DRAWINGS

The FIG. 1 is a schematic structural diagram of a tungsten hexafluoride preparation apparatus based on photoelectric synergy according to the present disclosure.

Reference numerals in the FIG. 1: 1. sulfur hexafluoride gas cylinder; 2. first gas supply branch pipe; 3. first pressure-reducing valve; 4. argon gas cylinder; 5. second gas supply branch pipe; 6. second pressure-reducing valve; 7. hydrogen gas cylinder; 8. third gas supply branch pipe; 9. third pressure-reducing valve; 10. gas mixer; 11. plasma reactor; 12. flange; 13. encapsulation shell; 14. ultraviolet lamp tube; 15. deposition pool; 16. first gas outlet; 17. condenser; 18. gas guide pipe; 19. liquid collection pipe; 20. liquid collection pool; 21. second gas outlet; 22. exhaust gas inlet pipe; 23. alkaline solution treatment pool; 24. exhaust gas outlet pipe; 25. $TiO_2$; and 26. metal-organic framework (HKUST-1).

DETAILED DESCRIPTIONS OF THE EMBODIMENTS

A tungsten hexafluoride preparation apparatus based on photoelectric synergy provided in the present disclosure will be elaborated hereafter in conjunction with the accompanying drawings.

Example 1

A structure of a tungsten hexafluoride preparation apparatus based on photoelectric synergy provided in this example is shown in the FIG. 1, and the apparatus includes a sulfur hexafluoride ($SF_6$) gas supply unit, a background gas supply unit, a hydrogen gas supply unit, a mixing unit, a photoelectric combined reactor, a condensation unit, and an exhaust gas treatment unit.

Specifically, the sulfur hexafluoride gas supply unit a sulfur hexafluoride gas cylinder 1, a first gas supply branch pipe 2 and a first pressure-reducing valve 3, where an inlet of the first gas supply branch pipe 2 is connected to the sulfur hexafluoride gas cylinder 1, the first pressure-reducing valve 3 is installed on the first gas supply branch pipe 2, and sulfur hexafluoride inside the sulfur hexafluoride gas cylinder 1 is depressurized via the first pressure-reducing valve 3 before entering a gas mixer 10.

The background gas supply unit includes an argon gas cylinder 4, a second gas supply branch pipe 5, and a second pressure-reducing valve 6, where an inlet of the second gas supply branch pipe 5 is connected to the argon gas cylinder 4, the second pressure-reducing valve 6 is installed on the second gas supply branch pipe 5, and argon inside the argon gas cylinder 4 is depressurized via the second pressure-reducing valve 6 before entering the gas mixer 10.

The hydrogen gas supply unit includes a hydrogen gas cylinder 7, a third gas supply branch pipe 8, and a third pressure-reducing valve 9, where one end of the third gas supply branch pipe 8 is connected to the hydrogen gas cylinder 7, the third pressure-reducing valve 9 is installed on the third gas supply branch pipe 8, and hydrogen inside the hydrogen gas cylinder 7 is depressurized via the third pressure-reducing valve 9 before entering the gas mixer 10.

The mixing unit includes the gas mixer 10, a gas supply main pipe, a flow meter (not shown), and a control valve (not shown), the other ends of the first gas supply branch pipes 2, the second gas supply branch pipe 5 and the third gas supply branch pipe 8 are connected to three inlets of the gas mixer 10, one end of the gas supply main pipe is connected to an outlet of the gas mixer 10, the flow meter and the control valve are installed on the gas supply main pipe, and the other end of the gas supply main pipe is connected to an inlet of the plasma reactor.

The photoelectric combined reactor includes a plasma reactor 11 and an encapsulation shell 13, where the plasma reactor 11 is a coaxial dual-layer dielectric barrier discharge reactor, and an outer side wall (that is, an outer barrier medium) of a discharge area of the plasma reactor 11 is made of quartz glass, which is transparent to light; and two ends of the discharge area of the plasma reactor 11 is respectively provided with a flange 12, the plasma reactor 11 is placed vertically, an inlet of the plasma reactor 11 is arranged on the flange 12 located above, and an outlet of the plasma reactor 11 is arranged on the flange 12 located below.

The encapsulation shell 13 is in a shape of cuboid, rectangular, and inner wall surfaces of the encapsulation shell 13 are mirror surfaces, such that the inner wall surfaces of the encapsulation shell 13 are capable of reflecting light; the encapsulation shell 13 encloses the discharge area of the plasma reactor 11, a vertical symmetry plane of the encapsulation shell 13 is the same as a vertical symmetry plane of the plasma reactor 11, and two ends of the encapsulation shell 13 are fixed to the two flanges 12; a pair of light source assemblies are symmetrically arranged inside the encapsulation shell 13, and each of the light source assemblies is located outside the plasma reactor 11; and each of the light source assemblies consists of a plurality of ultraviolet lamp tubes 14 and a lamp holder, the plurality of ultraviolet lamp tubes 14 are arranged side by side, each of the ultraviolet lamp tubes 14 is fixed on the lamp holder, and the lamp holder is mounted at a bottom of the encapsulation shell 13.

A deposition pool 15 for collecting sulfur is arranged at a bottom of the plasma reactor 11, the deposition pool 15 is cylindrical, the plasma reactor 11 and the deposition pool 15 are coaxially arranged, the deposition pool 15 is located below the plasma reactor 11, and the deposition pool 15 is connected to the outlet of the plasma reactor 11; a temperature inside the deposition pool 15 is controlled to be 40° C.-100° C., such that the sulfur can be stored in a solid form; and a first gas outlet 16 is formed at a top of a side wall of the deposition pool 15 for releasing generated tungsten hexafluoride ($WF_6$) gas.

A tungsten hexafluoride gas collection unit includes a condenser 17, a gas guide pipe 18, and a liquid collection pool 20, where one end of the gas guide pipe 18 is connected to the first gas outlet 16, and the other end of the gas guide pipe 18 is connected to an inlet of the condenser 17; a vertically arranged liquid collection pipe 19 is arranged at a bottom of the condenser 17, an upper end of the liquid collection pipe 19 is connected to a liquid outlet at the bottom of the condenser 17, a lower end of the liquid collection pipe 19 extends into the liquid collection pool 20, and $WF_6$ condensed into liquid flows into the liquid collection pool 20 for collection; and the condenser 17 is further provided with a second gas outlet 21 for collecting uncondensed exhaust gas.

The exhaust gas treatment unit includes an alkaline solution treatment pool 23, an exhaust gas inlet pipe 22, and an exhaust gas outlet pipe 24, where one end of the exhaust gas inlet pipe 22 is connected to the second gas outlet 21, and the other end of the exhaust gas inlet pipe 22 extends into a bottom of alkaline solution in the alkaline solution treatment pool 23; and the exhaust gas outlet pipe 24 is communicated with upper alkaline solution in the alkaline solution treatment pool 23; and the alkaline solution treatment pool 23 absorbs and treats decomposition products of $SF_6$, such as $SO_2$, $SOF_2$, and $SOF_4$, to prevent them from being discharged into the atmosphere and causing damage to the atmosphere and environment.

A tungsten hexafluoride preparation apparatus based on photoelectric synergy provided in the present disclosure will be elaborated hereafter in conjunction with the above apparatus.

Example 2

S1: fill an upper part of the plasma reactor 11 with a photocatalyst (TiO$_2$) 25, load tungsten powder onto a metal-organic framework (HKUST-1) 26, and fill the metal-organic framework 26 in a lower part of the plasma reactor 11; the metal-organic framework 26 has a relatively large specific surface area; as a carrier for the tungsten powder, it can increase a contact area between the tungsten powder and the reaction gas (SF$_6$), which is beneficial for the reaction; in addition, the metal-organic framework 26 can also serve as a catalyst to catalyze the reaction of fluorine atoms and low-fluorine sulfides with the tungsten powder;

S2. assemble and connect the tungsten hexafluoride preparation apparatus based on photoelectric synergy according to a connection relationship of the above apparatus (shown in the FIG. 1);

S3. open the second pressure-reducing valve 6 and introduce argon gas to check the gas tightness of the apparatus, thereby preventing toxic gases from leakage during the reaction and from causing harm to personnel, and ensuring stable and orderly operation of the reaction; and close the second pressure-reducing valve 6 upon completion of the check;

S4. turn on the plasma reactor 11 and the pair of light source assemblies, set an input voltage to 10 kV and an input power to 100 W; a temperature inside the plasma reactor 11 will rise at the very beginning, and the temperature inside the plasma reactor 11 will stabilize at 135° C. after 10 min; a temperature inside the deposition pool 15 is controlled at 55° C.; and at the same time, a condenser 17 is turned on to make a temperature thereof reach a liquefaction temperature of WF$_6$ gas at 10° C.;

S5. open the first pressure-reducing valve 3, the second pressure-reducing valve 6, the third pressure-reducing valve 9, the flow meter, and the control valve; the sulfur hexafluoride gas in the sulfur hexafluoride cylinder 1, the argon gas in the argon cylinder 4, and the hydrogen gas in the hydrogen cylinder are depressurized and introduced into the gas mixer 10 for uniform mixing, and a flow rate of mixed gas is precisely controlled by the flow meter and the control valve;

S6: have the mixed gas from the gas mixer 10 entered the plasma reactor 11, where the argon gas is ionized into plasma (high-energy electrons); the sulfur hexafluoride gas is activated and decomposed under the synergistic effect of plasma and photocatalysis, the sulfur hexafluoride gas is decomposed into fluorine atoms and low-fluorine sulfides (such as SF$_5$, and SF$_4$), the fluorine atoms and the low-fluorine sulfides react with the tungsten (W) powder under the catalytic action of the metal-organic framework 26 to generate WF$_6$ gas, and a large amount of sulfur is generated with the participation of reducing gas H$_2$ at the same time; the WF$_6$ gas enters the condenser 17 for liquefaction, and then flows into the liquid collection pool 20 for collection, the exhaust gas is then treated in the alkaline solution treatment pool 23, where unreacted decomposition products of SF$_6$ (such as F$_2$, SF$_5$, SF$_4$ and other gases) and impurity gases such as SO$_2$, SOF$_2$, and SOF$_4$ are absorbed, and the generated liquid elemental sulfur flows into the deposition pool 15, and is sorted in the deposition pool 15 in a solid form; and S7: close the first pressure-reducing valve 3 when no more liquid flows from the condenser 17; turn off the plasma reactor 11 and the pair of light source assemblies ten minutes later, and introduce argon and hydrogen gases continuously to drive the gas in the plasma reactor 11 sequentially through the condenser 17 and the alkaline solution treatment pool 23; and turn off the condenser 17, the second pressure-reducing valve 6, the third pressure-reducing valve 9, the flow meter, and the control valve ten minutes later, and take out the WF$_6$ liquid from the liquid collection pool 20 and store it in a frozen state.

What is claimed is:

1. A tungsten hexafluoride preparation method based on photoelectric synergy, comprising the following steps:

S1, filling a photocatalyst and metal tungsten sequentially in a discharge area of a plasma reactor in a direction of gas entry;

S2, introducing background gas and sulfur hexafluoride gas into the discharge area of the plasma reactor while irradiating the discharge area of the plasma reactor with light, the background gas is ionized into plasma, and the sulfur hexafluoride gas is activated and ionized to decompose into fluorine atoms and low-fluorine sulfides under the synergistic effect of plasma and photocatalysis;

S3: having the generated fluorine atoms and low-fluorine sulfides reacted with the metal tungsten to generate tungsten hexafluoride (WF$_6$) gas and elemental sulfur, a reaction temperature is controlled at 120-160° C., making the elemental sulfur become liquid; and the plasma reactor is tilted or placed vertically, such that the generated liquid elemental sulfur can flow out from a bottom of the plasma reactor for collection; while the generated WF$_6$ gas is condensed into liquid and then collected;

wherein in the step S2, reducing gas H$_2$ is introduced while the background gas and the sulfur hexafluoride gas are introduced into the discharge area of the plasma reactor;

wherein the metal tungsten is loaded through a metal-organic framework and then filled into the discharge area of the plasma reactor.

2. The tungsten hexafluoride preparation method based on photoelectric synergy according to claim 1, wherein in the step S3, unreacted fluorine, low-fluorine sulfides, and generated impurity gases are absorbed and purified by alkaline solution.

3. The tungsten hexafluoride preparation method based on photoelectric synergy according to claim 1, wherein a tungsten hexafluoride preparation apparatus comprises a sulfur hexafluoride gas supply unit, a background gas supply unit, a mixing unit, a photoelectric combined reactor and condensation unit, wherein the sulfur hexafluoride gas supply unit and the background gas supply unit are connected to the mixing unit, respectively, the photoelectric combined reactor comprises a plasma reactor and an encapsulation shell, the encapsulation shell encloses a discharge area of the plasma reactor, an outer shell of the discharge area of the plasma reactor is transparent, two ends of the encapsulation shell are respectively fixedly connected to two ends of the plasma reactor, inner wall surfaces of the encapsulation shell are mirror surfaces, at least two evenly distributed light source assemblies are arranged inside the encapsulation shell, each of the light source assemblies is located outside the plasma reactor, and the mixing unit is connected to an inlet of the plasma reactor;

wherein the plasma reactor is placed vertically or tilted, an elemental sulfur collector is arranged at a bottom of the plasma reactor, the elemental sulfur collector is located below the plasma reactor, a first liquid outlet is arranged at the bottom of the plasma reactor, the elemental sulfur collector is communicated with first liquid outlet, and a gas outlet is formed at a top of the elemental sulfur collector;

the condensation unit comprises a condenser, a gas guide pipe and a tungsten hexafluoride collector, wherein one end of the gas guide pipe is communicated with the gas outlet of the top of the elemental sulfur collector, the other end of the gas guide pipe is connected to an inlet of the condenser, a second liquid outlet and a second gas outlet are formed on the condenser, and the tungsten hexafluoride collector is connected to the second liquid outlet; further comprises a hydrogen gas supply unit, wherein the hydrogen gas supply unit is connected to the mixing unit.

4. The tungsten hexafluoride preparation method based on photoelectric synergy according to claim 1 further comprising an exhaust gas treatment unit, which comprises an alkaline solution treatment pool, an exhaust gas inlet pipe, and an exhaust gas outlet pipe, wherein one end of the exhaust gas inlet pipe is connected to the second gas outlet, and the other end of the exhaust gas inlet pipe extends into a bottom of alkaline solution in the alkaline solution treatment pool; and the exhaust gas outlet pipe is communicated with upper alkaline solution in the alkaline solution treatment pool.

* * * * *